(12) United States Patent
Willers et al.

(10) Patent No.: US 11,699,075 B2
(45) Date of Patent: Jul. 11, 2023

(54) METHOD FOR TRAINING AN ARTIFICIAL NEURAL NETWORK, ARTIFICIAL NEURAL NETWORK, USE OF AN ARTIFICIAL NEURAL NETWORK, AND CORRESPONDING COMPUTER PROGRAM, MACHINE-READABLE MEMORY MEDIUM, AND CORRESPONDING APPARATUS (71) Applicant: Robert Bosch GmbH, Stuttgart (DE)

(72) Inventors: Oliver Willers, Korb (DE); Sebastian Sudholt, Neuenstadt Am Kocher (DE)

(73) Assignee: ROBERT BOSCH GMBH, Stuttgart (DE)

( * ) Notice: Subject to any disclaimer, the term of this patent is extended or adjusted under 35 U.S.C. 154(b) by 402 days.

(21) Appl. No.: 16/911,681

(22) Filed: Jun. 25, 2020

(65) Prior Publication Data

US 2020/0410342 A1 Dec. 31, 2020

(30) Foreign Application Priority Data

Jun. 28, 2019 (DE) .................... 10 2019 209 457.0

(51) Int. Cl.
*G06N 3/08* (2023.01)
*G06N 20/20* (2019.01)
*G06N 7/01* (2023.01)
*G06V 10/764* (2022.01)
*G06V 20/56* (2022.01)

(52) U.S. Cl.
CPC ................. *G06N 3/08* (2013.01); *G06N 7/01* (2023.01); *G06N 20/20* (2019.01); *G06V 10/764* (2022.01); *G06V 20/56* (2022.01)

(58) Field of Classification Search
CPC ........... G06N 3/08; G06N 20/20; G06N 7/005
See application file for complete search history.

(56) References Cited

U.S. PATENT DOCUMENTS

| 10,127,795 | B1 * | 11/2018 | Hwang | ................. H04W 4/023 |
| 10,657,676 | B1 * | 5/2020 | Rehfeld | ............... G06N 3/0472 |
| 11,209,345 | B1 * | 12/2021 | Madsen | ................ G06N 20/00 |
| 2017/0124448 | A1 * | 5/2017 | Engel | ..................... G06F 11/00 |

(Continued)

OTHER PUBLICATIONS

Depeweg, S. "Modeling Epistemic and Aleatoric Uncertainty with Bayesian Neural Networks and Latent Variables" The dissertation was written on Apr. 10, 2019 at the Technical University of Munich, pp. 1-128.*

(Continued)

*Primary Examiner* — Mia M Thomas
(74) *Attorney, Agent, or Firm* — Norton Rose Fulbright US LLP; Gerard Messina (57) ABSTRACT

A method for training an artificial neural network, in particular a Bayesian neural network, by way of training data sets, having a step of adapting the parameters of the artificial neural network depending on a loss function, the loss function encompassing a first term that represents an estimate of a lower bound of the distances between the classifications of the training data sets by the artificial neural network and the expected classifications of the training data sets. The loss function further encompasses a second term that is configured in such a way that differences in the aleatoric uncertainty in the training data sets over different samples of the artificial neural network are regulated.

13 Claims, 10 Drawing Sheets (56) References Cited

U.S. PATENT DOCUMENTS

| | | | |
|---|---|---|---|
| 2019/0279094 A1* | 9/2019 | Baughman | G06N 3/082 |
| 2020/0034661 A1* | 1/2020 | Kim | G06N 3/0454 |
| 2020/0234086 A1* | 7/2020 | Taha | G06N 3/08 |
| 2020/0410342 A1* | 12/2020 | Willers | G06N 7/005 |
| 2020/0410364 A1* | 12/2020 | Willers | G06N 7/01 |
| 2021/0103487 A1* | 4/2021 | Rosales | G06F 16/9024 |
| 2022/0067737 A1* | 3/2022 | Wittenbach | G06Q 20/4016 |

OTHER PUBLICATIONS

Truong-Le, et al.: Uncertainty Estimation for Deep Neural Object Detectors in Safety-Critical Applications, 21st International Conference on Intelligent Transportation Systems (ITSC), Maui, Hawaii, (2018), pp. 3873-3878.

Guo, G., et al., "On Calibration of Modern Neural Networks," Cornell University, 2017, pp. 1-17. http://arxiv.org/abs/1706.04599V2.

Kenndall, A., et al., "What Uncertainties Do We Need in Bayesian Deep Learning for Computer Vision?," Cornell University, 2017, pp. 1-12. http://arxiv.org/abs/1703.04977.

Gal, Y., et al., "Dropout as a Bayesian Approximation: Insights and Applications," in Deep Learning Workshop, University of Cambridge, ICML, 2015, pp. 1-10.

Blundell, C., et al., "Weight Uncertainty in Neural Networks," Cornell University, 2015, pp. 1-10. http://arxiv.org/abs/1505.05424V2.

\* cited by examiner

901 — adapt parameter depending on loss function

METHOD FOR TRAINING AN ARTIFICIAL NEURAL NETWORK, ARTIFICIAL NEURAL NETWORK, USE OF AN ARTIFICIAL NEURAL NETWORK, AND CORRESPONDING COMPUTER PROGRAM, MACHINE-READABLE MEMORY MEDIUM, AND CORRESPONDING APPARATUS

CROSS REFERENCE

The present application claims the benefit under 35 U.S.C. § 119 of German Patent Application No. DE 102019209457.0 filed on Jun. 28, 2019, which is expressly incorporated herein by reference in its entirety.

FIELD

The present invention relates to a method for training an artificial neural network, to an artificial neural network, to a use of an artificial neural network, and to a corresponding computer program and machine-readable memory medium and to a corresponding apparatus.

A preferred area of application of the present invention is in the field of autonomous systems, in particular in the field of at least semi-automated driving.

"At least semi-automated driving" means controlling a vehicle in a context in which at least some, or the entirety, of the driving task is taken over by at least one vehicle system. If the entire driving task is taken over, the term "fully automatically operated vehicle" or "highly automatically operated vehicle" is used. The vehicle drives automatically by the fact that, for example, it autonomously recognizes the road layout, other traffic participants, or obstacles, for example by way of corresponding environmental sensor equipment, and calculates the corresponding control instructions at least partly in the vehicle and forwards them to the actuators in the vehicle, the driving behavior of the vehicle being correspondingly influenced. In a fully automatically or highly automatically operated vehicle, a human driver no longer participates in the driving task.

With the changeover from driver assistance systems, which require complete attention on the part of the driver (so-called level 1 and level 2 driver assistance systems) in stages to fully automated driving (so-called level 3 to level 5 driver assistance systems), fundamental issues arise with regard to system security. The use of deep neural networks (DNNs) for safety-relevant tasks, such as recognizing and classifying objects, in particular generates completely new problems regarding system security.

"Vehicles" are understood here as land-based vehicles, aircraft, spacecraft, and watercraft, in particular passenger cars, commercial vehicles, buses, shuttles, two-wheeled vehicles, boats, airplanes, helicopters, and drones.

BACKGROUND INFORMATION

The document by C. Guo, G. Pleiss, Y. Sun, and K. Q. Weinberger, "On Calibration of Modern Neural Networks," ArXiv e-prints, June 2017, describes that the output probabilities of deep neural networks (DNNs) are not well-calibrated. This means that DNNs that are used for object recognition indicate only what they have recognized, but not how certain that recognition was. For safe automated driving it is extremely important to know what a recognition model is uncertain about. For example, an automatically operated vehicle might recognize an object in front of it as a pedestrian, but might be uncertain as to its location. In such a situation the system could promptly warn the driver and prompt him or her to take over the driving task, or to decelerate, in order to avoid a fatal accident.

The document A. Kenndall and Y. Gal, "What uncertainties do we need in Bayesian deep learning for computer vision?", CoRR, Vol. abs/1703.04977, 2017 [online]; obtainable at http://arxiv.org/abs/1703.04977, describes that there are two kinds of uncertainty in conjunction with artificial neural networks. Epistemic uncertainty, or model uncertainty, indicates how uncertain the output of an artificial neural network is with respect to the data on which it was trained. Aleatoric uncertainty, on the other hand, reflects uncertainties in the task which are based on shortcomings in the processed data.

These can be sensor shortcomings, such as noise, motion blur, etc. For example, observations of an unusual object that was not part of the training data set results in a high epistemic uncertainty, while observation of a distant object can result in a higher aleatoric uncertainty. For safe automated driving it is essential to take both types of uncertainty into account in the context of an artificial neural network for object recognition, since the epistemic uncertainty represents an indicator of the limits of the recognition model, while the aleatoric uncertainty represents an indicator of sensor noise in the context of object tracking. The authors propose for that purpose that the artificial neural network learn the aleatoric uncertainty by unobserved loss attenuation. This currently represents the de facto standard procedure for training artificial neural networks to predict aleatoric uncertainties.

The document by Y. Gal and Z. Ghahramani, "Dropout as a Bayesian Approximation: Insights and Applications," in Deep Learning Workshop, ICML, 2016, and C. Blundell, J. Cornebise, K. Kavukcuoglu, and D. Wiestra, "Weight Uncertainty in Neural Networks," ArXiv e-prints, May 2015, describe that Bayesian neural networks are suitable for modeling the epistemic uncertainty. This is achieved by using probability distributions rather than point estimates as weights for the artificial neural network.

The conventional procedure for training the aleatoric uncertainty is disadvantageous in that it is impossible to guarantee that the outputted aleatoric uncertainty does not also contain epistemic components.

SUMMARY

The present invention provides a method for training an artificial neural network by way of training data sets, having a step of adapting a parameter of the artificial neural network depending on a loss function, the loss function encompassing a first term that represents an estimate of an expected lower bound (ELBO) of the distances between the classifications of the training data sets by the artificial neural network and the expected classifications of the training data sets.

The present invention is based on the recognition that the aleatoric uncertainty $\sigma^2$ depends only on the input data present at run time (e.g. the camera images, radar signals, etc.) and not on the underlying training data. In order to determine the epistemic uncertainty in a Bayesian neural network, implementations are respectively drawn from the probability distributions of the weights ("samples") of the Bayesian neural network, and with them a set of possible outputs of the artificial neural network is determined. The epistemic uncertainty is then estimated via the variance of the various outputs. Because the aleatoric uncertainty depends only on the input data, it should remain constant over the various outputs. The present invention therefore provides that the loss function encompass a second term that is configured in such a way that differences in the aleatoric uncertainty in the training data sets over different samples of the artificial neural network are regulated.

This means that differences in the aleatoric uncertainty over the various tasks during training are "penalized."

The advantageous result is that the output of $\sigma^2$ is "penalized" if it does not represent only the aleatoric uncertainty during training. The aleatoric and epistemic uncertainties are thereby separated from one another. The epistemic uncertainties can thereby be modeled with confidence. This has the advantage that during the training process it is possible to estimate, with the aid of the epistemic uncertainties, the situations for which insufficient training data still exist. It furthermore permits analysis of the causes of insufficient performance by the neural network. This can be used to answer questions as to whether insufficient training data are available, or whether the sensor information does not permit any better output.

A "loss function" can be understood in the present case as a function that represents a distance between the output to be achieved by the trained artificial neural network and the output outputted by the artificial network that is to be trained.

A logarithmic plausibility function, in particular the "standard negative log likelihood function," is typically used as a loss function.

An "artificial neural network" is to be understood in the present case as a network of artificial neurons for information processing. Artificial neural networks experience essentially three phases. In an initial phase a basic topology, usually dependent on the objective, is predefined. That is followed by a training phase in which the basic topology is learned by way of training data in order to efficiently achieve the objective. The topology of the network can also be adapted within the training phase. Training data are notable for the fact that the desired output data for the input data are typically available. Last in the sequence is an application phase in which the trained network is applied to input data for which no desired output data exist. The output data of the trained network then represent output data desired in accordance with the objective.

A Bayesian neural network can be trained as an artificial neural network. A Bayesian neural network is notable for the fact that the weights of the artificial neural network are indicated not as fixed values but as probability distributions over weight values.

If the probability distributions over the weight values are configured so that the mean is assumed to have a probability of 1, a "normal" artificial neural network having fixed weight values then exists.

Embodiments of Bayesian artificial neural networks constitute mixed forms having weights as probability distributions over weight values and as fixed weight values.

In order to train a Bayesian artificial neural network, the network must be sampled at training time. This means that, proceeding from the probability distributions, concrete values for the weight $w_i$, which constitute a sample t of the Bayesian network, must be determined.

The standard loss function for training a Bayesian neural network is an estimate of the expected lower bound (ELBO):

$$l_{ELBO} = \sum_{t=1}^{T} \log q(w^{(t)} | \theta) - \log P(w^{(t)}) - \log P(D | w^{(t)}),$$

where
$\theta$=parameter of the probability distributions of the weights
$w^{(t)}$=weights of sample t
D=training data
T=total number of all samplings
$-\log P(x)$=negative log likelihood function
q=variational posterior, i.e. approximated a posteriori probability of the weights.

A "training data set" D can be understood in the present instance as a data set that is used to train an artificial neural network. Training data sets are typically annotated data, i.e., labeled data. In other words, for the respective datum of the data set, the result y to be achieved by the artificial neural network is known and is used for comparison with the output $\hat{y}$ generated by the network to be trained. Based on the comparison between the desired result y and the generated output $\hat{y}$, adaptation of the parameters of the network to be trained is performed depending on a loss function.

In conventional deep artificial neural networks (DNNs) for object recognition, the network predicts a so-called bounding box $\hat{y}$ (typically represented by four parameters, for example the x and y coordinates of the top left corner and the width w and height h). In order to train the artificial neural network in such a way that it predicts the desired bounding box $\hat{y}$, it is necessary to minimize a loss function that reproduces the distance between the network's prediction $\hat{y}$ and the target value y (also called a "label"). If the L1 loss function is used, for example, the network is then trained by minimizing the following loss function:

$$l_{L1}(\hat{y}, y) = \sum_{i} |\hat{y}_i - y_i|.$$

In order to predict the aleatoric uncertainty, the output of the network is modeled as a normal distribution and the network additionally outputs the value $\sigma^2$ that represents the variance of the prediction. A high value of the outputted variance $\sigma^2$ correspondingly represents a high aleatoric uncertainty, and vice versa. In order to train the artificial neural network so that it predicts this variance, the standard loss function is supplemented with a variance prediction in accordance with the function below:

$$l_{AU}(\hat{y}, y) = \sum_{i} \frac{1}{\sigma^2} |\hat{y}_i - y_i| + \frac{1}{2} \log \sigma^2.$$

In order to combine both the aleatoric and the epistemic uncertainty in a single model, the combined uncertainty U can be approximated by the fact that the model samples a predefined number T, the aleatoric uncertainties being averaged and the variance for predictions being calculated in accordance with the function below:

$$U(\hat{y}^{(1)}, \ldots, \hat{y}^{(T)}, \sigma^{2(t)}) = \frac{1}{T}\sum_{t=1}^{T} \hat{y}^{2(t)} - \left(\frac{1}{T}\sum_{t=1}^{T} \hat{y}^{(t)}\right)^2 + \frac{1}{T}\sum_{t=1}^{T} \sigma^{2(t)}.$$

According to an example embodiment of the method of the present invention, the first term represents the expected lower bound (ELBO).

The first term can encompass a regulating part and the negative log likelihood function.

According to an example embodiment of the method of the present invention, the second term represents the square of the distance between the variance determination of the training data set and the average variance determination of the training data set over all effected samples of the Bayesian neural network being trained.

According to a manifestation of this embodiment, the second term encompasses a hyperparameter α.

A "hyperparameter" is understood in the present instance to mean a parameter that does not describe the artificial neural network to be trained per se, but instead is used, for example, to control the training process of the network to be trained. Typical hyperparameters are the "learning rate," which represents an indicator of the adaptation of the network for each learning pass. A further conventional hyperparameter is the number of training epochs, an "epoch" referring to a complete pass through the training data.

In the context of the present invention, the hyperparameter controls the influence of the second term on the result of the loss function, and thus provides an indicator of the "penalty" or consideration of the aleatoric error.

According to an embodiment of the method of the present invention, the lower bound is estimated by way of the loss function as defined below:

$$l_{ELBO} = \sum_{t=1}^{T} \{\log q(w^{(t)}|\theta) - \log P(w^{(t)}) - \log P(D|w^{(t)})\} + \frac{\alpha}{T}\sum_{t=1}^{T}\left(\sigma^{2(t)} - \left(\frac{1}{T}\sum_{t=1}^{T}\sigma^{2(t)}\right)\right)^2,$$

where
α=hyperparameter of the artificial neural network
θ=parameter of the probability distributions of the weights
σ²=variance
$w^{(t)}$=weights of sample t
D=training data
T=total number of all samplings
−log P(x)=negative log likelihood function
q=variational posterior, i.e. approximated a posteriori probability of the weights.

A further aspect of the present invention is a computer program that is configured to execute all steps of an embodiment of the method of the present invention.

A further aspect of the present invention is a machine-readable memory medium on which the computer program according to the present invention is stored.

A further aspect of the present invention is an artificial neural network that is trained by way of an embodiment of the method of the present invention.

A further aspect of the present invention is the use of an artificial neural network according to the present invention to control a technical system, in particular a robot, a vehicle, a tool, or a machine.

An artificial neural network trained in this manner is preferably used in a technical system, in particular in a robot, a vehicle, a tool, or a machine, to determine output variables as a function of input variables. Sensor data, or variables ascertained depending on sensor data, are appropriate as input variables of the artificial neural network. The sensor data can derive from sensors of the technical system or can be received by the technical system from outside the technical system. Control is applied, by a computation unit of the technical system, depending on the output variables of the artificial neural network, to at least one actuator of the technical system via a control application signal. For example, a motion of a robot or vehicle can be controlled, or a drive unit or a driver assistance system of a vehicle can be controlled.

In the context of the evaluation of sensor data, an artificial neural network that has been trained in accordance with the method for training an artificial neural network according to the present invention also supplies, in addition to allocation to a class, an indication as to the certainty of that allocation.

Not only the class allocation but also the certainty of the allocation can be taken into consideration when such networks are utilized to control a technical system. It is thus possible to furnish reliable control systems for technical systems.

A further aspect of the present invention is a further computer program that is configured to execute all steps of a use of an artificial neural network according to the present invention in order to control a machine according to the present invention.

A further aspect of the present invention is a further machine-readable memory medium on which the further computer program according to the present invention is stored.

A further aspect of the present invention is an apparatus for controlling a machine which is configured for use of an artificial neural network according to the present invention in accordance with the present invention.

Exemplifying embodiments of the present invention are explained below with reference to the figures.

DETAILED DESCRIPTION OF EXAMPLE EMBODIMENTS

Figure 1:
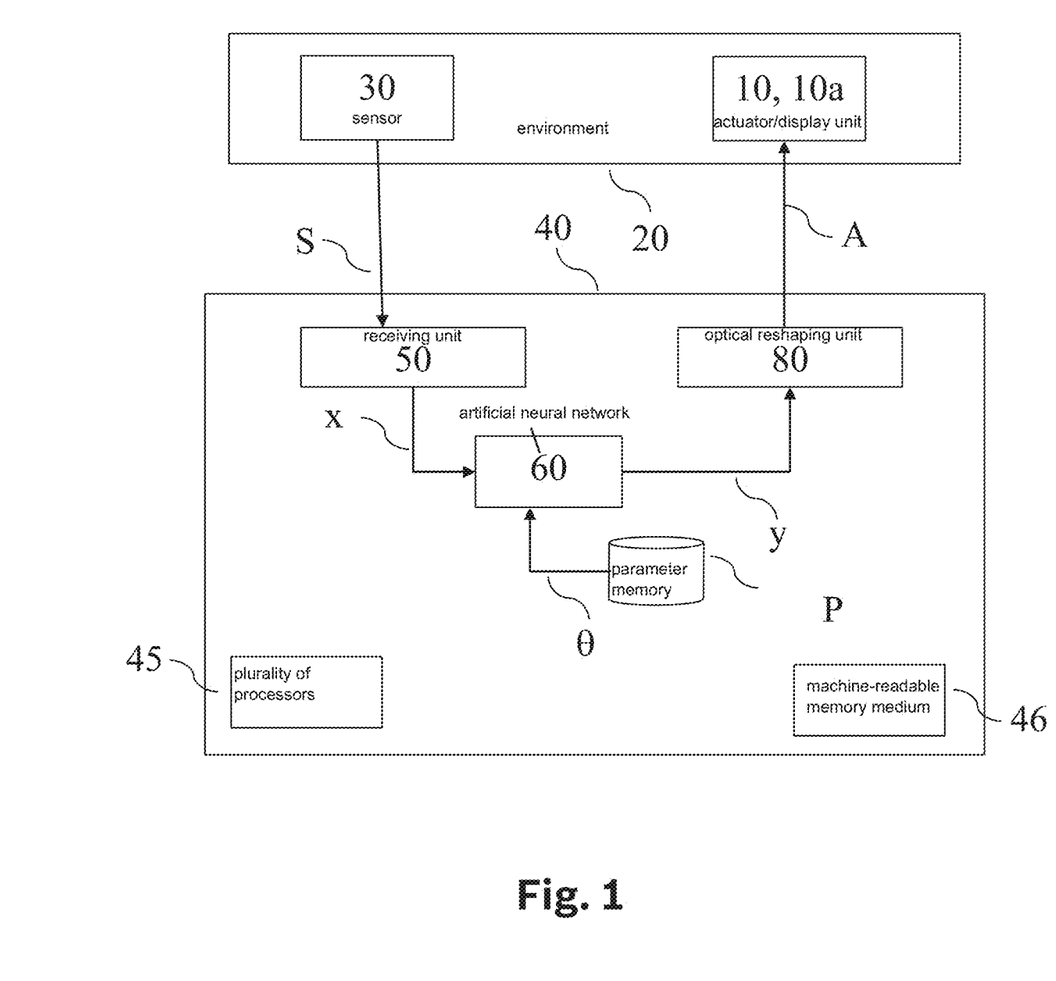
FIG. 1 shows a general control system in accordance with an example embodiment of the present invention.

FIG. 1 shows an actuator 10 in its environment 20, in interaction with a control system 40 or technical system 40.

Actuator 10 and environment 20 are commonly also referred to as an "actuator system." At preferably regular time intervals, a state of the actuator system is detected using a sensor 30 that can also exist as a plurality of sensors. Sensor signal S (or, in the case of multiple sensors, each sensor signal S) of sensor 30 is conveyed to control system 40. Control system 40 thus receives a sequence of sensor signals S. Control system 40 ascertains therefrom control application signals A that are transferred to actuator 10.

Sensor 30 is any sensor that detects a state of environment 20 and conveys it as sensor signal S. It can be, for example, an image-producing sensor, in particular an optical sensor such as an image sensor or a video sensor or a radar sensor or an ultrasonic sensor or a LIDAR sensor. It can also be an acoustic sensor that, for example, receives solid-borne sound or voice signals. The sensor can also be a position sensor (for example GPS) or can be a kinematic sensor (for example a single- or multi-axis acceleration sensor). A sensor that characterizes an orientation of actuator 10 in environment 20 (for example, a compass) is also possible. A sensor that detects a chemical composition of environment 20 (for example, a lambda sensor) is also possible. Alternatively or additionally, sensor 30 can also encompass an information system that ascertains information regarding a state of the actuator system (for example, a weather information system that ascertains a current or future state of the weather in environment 20).

Control system 40 receives the sequence of sensor signals S of sensor 30 in an optional receiving unit 50 that converts the sequence of sensor signals S into a sequence of input signals x (alternatively, each sensor signal S can also be accepted directly as an input signal x). Input signal x can be, for example, a portion or a reprocessing of sensor signal S. Input signal x can encompass, for example, image data or images, or individual frames of a video recording. In other words, input signal x is ascertained depending on sensor signal S. Input signal x is delivered to an artificial neural network 60.

Artificial neural network 60 is preferably parameterized by parameters θ, for example encompassing weights $w_{11}$ to $w_{mm}$ that are stored in a parameter memory P and furnished thereby.

Artificial neural network 60 ascertains output signals y from input signals x. Typically, output signals y encode classification information of input signal x. Output signals y are delivered to an optional reshaping unit 80 that ascertains therefrom control application signals A that are delivered to actuator 10 in order to correspondingly apply control to actuator 10.

Actuator 10 receives control application signals A, has control correspondingly applied to it, and performs a corresponding action. Actuator 10 can encompass a (not necessarily physically integrated) control application logic that ascertains, from control application signal A, a second control application signal with which control is then applied to actuator 10.

In further embodiments, control system 40 encompasses sensor 30. In other further embodiments, control system 40 also, alternatively or additionally, encompasses actuator 10.

In further preferred embodiments, control system 40 encompasses one or a plurality of processors 45 and at least one machine-readable memory medium 46 on which are stored instructions which, when they are executed on processor 45, cause control system 40 to perform a method for controlling control system 40.

In alternative embodiments, a display unit 10a is provided alternatively or in addition to actuator 10.

Figure 2:
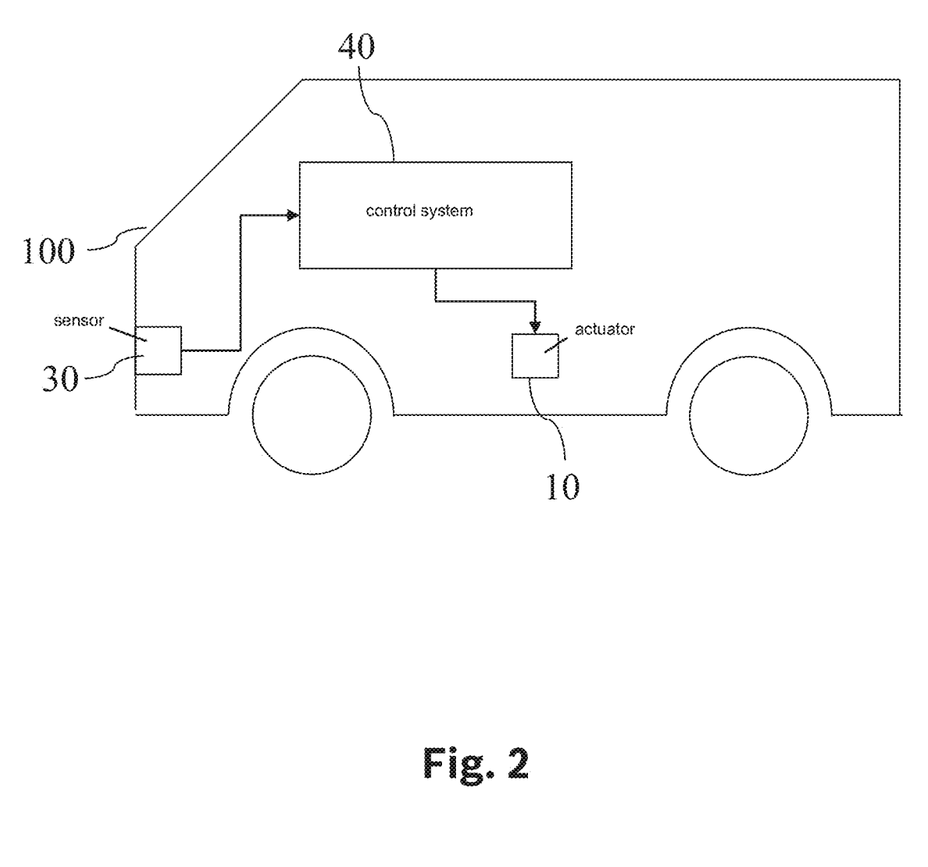
FIG. 2 shows an exemplifying embodiment of a control system in accordance with the present invention.

FIG. 2 shows an exemplifying embodiment in which control system 40 is used to control an at least semi-autonomous robot, here an at least semi-automated motor vehicle 100.

Sensor 30 can be one of the sensors recited in conjunction with FIG. 1, preferably one or several video sensors or one or several radar sensors or one or several ultrasonic sensors or one or several LIDAR sensors or one or several position sensors (e.g. GPS), preferably disposed in motor vehicle 100.

From input data x, artificial neural network 60 can detect, for example, objects in the environment of the at least semi-autonomous robot. Output signal y can be a datum that characterizes where objects are present in the environment of the at least semi-autonomous robot. Output signal (Control application signal) A can then be ascertained depending on or in accordance with that datum.

Actuator 10 preferably disposed in motor vehicle 100 can be, for example, a brake, a drive system, or a steering system of motor vehicle 100. Control application signal A can then be ascertained in such a way that actuator or actuators 10 have control applied to them so that motor vehicle 100, for example, prevents a collision with objects identified by artificial neural network 60, in particular if objects of specific classes, e.g., pedestrians, are involved. In other words, control application signals A can be ascertained depending on or in accordance with the ascertained class.

Alternatively, the at least semi-autonomous robot can also be another mobile robot (not depicted), for example one that moves by flying, floating, diving, or stepping. The mobile robot can also be, for example, an at least semi-autonomous lawnmower or an at least semi-autonomous cleaning robot. In these cases as well, control application signal A can be ascertained in such a way that a drive system or steering system of the mobile robot has control applied to it in such a way that the at least semi-autonomous robot, for example, prevents a collision with the objects identified by artificial neural network 60.

In a further alternative, the at least semi-autonomous robot can also be a horticultural robot (not depicted) that, using an image-producing sensor 30 and artificial neural network 60, ascertains a nature or a state of plants in environment 20. Actuator 10 can then be, for example, an applicator of chemicals. Control application signal A can be ascertained, depending on the ascertained nature or ascertained state of the plants, in such a way that a quantity of the chemicals which corresponds to the ascertained nature or to the ascertained state is applied.

In other further alternatives, the at least semi-autonomous robot can also be a domestic appliance (not depicted), in particular a washing machine, a range, an oven, a microwave oven, or a dishwasher. Using sensor 30, for example an optical sensor, a state of an object processed using the domestic appliance can be detected, for example, in the case of the washing machine, a state of laundry that is present in the washing machine. Using artificial neural network 60, a nature or a state of that object can then be ascertained and can be characterized by output signal y. Control application signal A can then be ascertained in such a way that the domestic appliance has control applied to it depending on the ascertained nature or ascertained state of the object. In the case of the washing machine, for example, control can be applied to it depending on the material of which the laundry present in it is made. Control application signal A can then be selected depending on the material of the laundry which has been ascertained.

Figure 3:
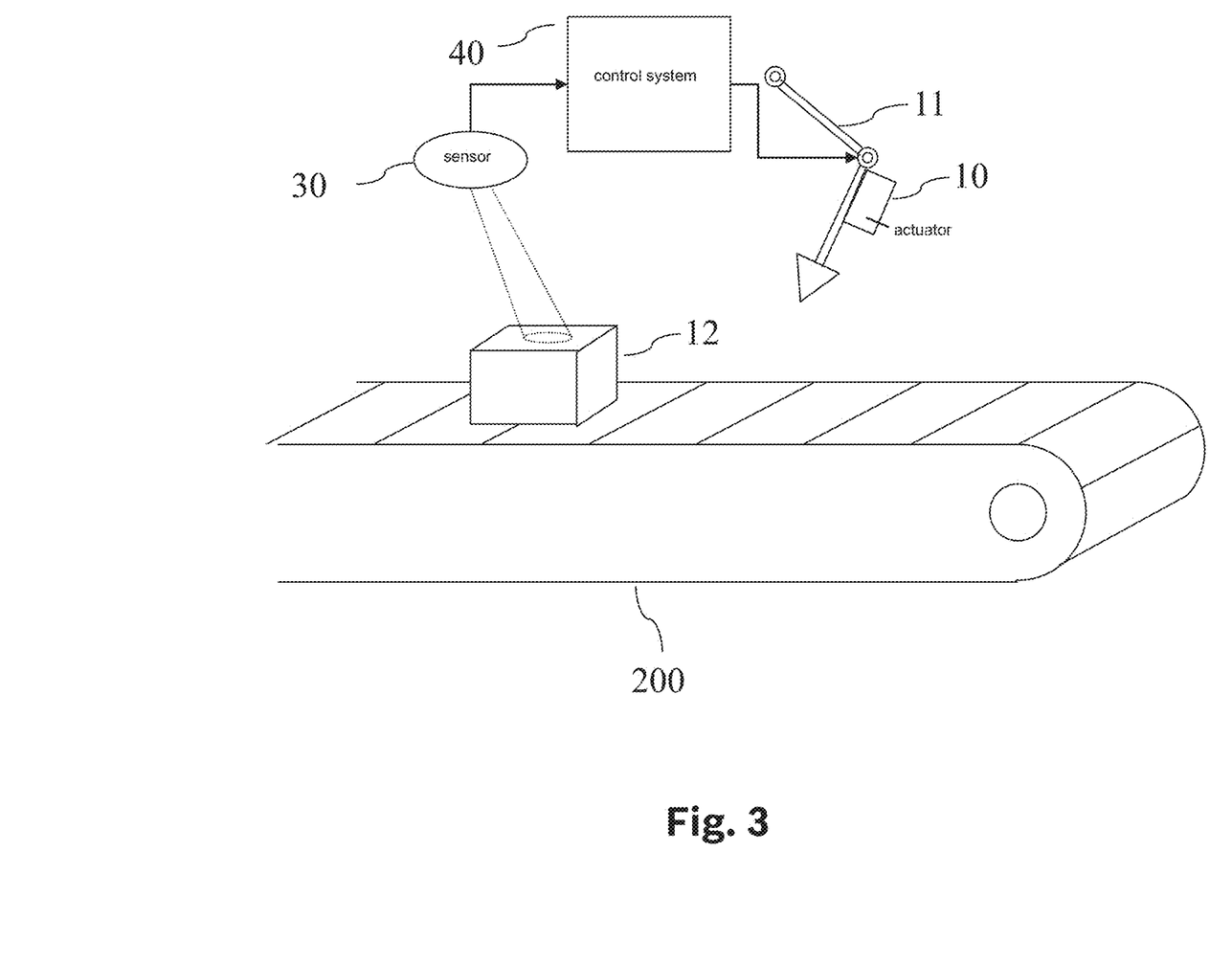
FIG. 3 shows a further exemplifying embodiment of a control system in accordance with the present invention.

FIG. 3 shows an exemplifying embodiment in which control system 40 is used to apply control to a machine 11 of a manufacturing system 200, by the fact that control is applied to an actuator 10 controlling said machine 11. Machine 11 can be, for example, a machine for stamping, sawing, drilling, or cutting.

Sensor 30 can be one of the sensors recited in conjunction with FIG. 1, preferably an optical sensor that detects, for instance, properties of manufactured products 12. It is possible for control to be applied to actuator 10 that controls machine 11 depending on the ascertained properties of manufactured product 12, so that machine 11 correspondingly performs a subsequent processing step on that manufactured product 12. It is also possible for sensor 30 to ascertain the properties of manufactured product 12 processed by machine 11, and as a function thereof to adapt a control application to machine 11 for a subsequent manufactured product.

Figure 4:
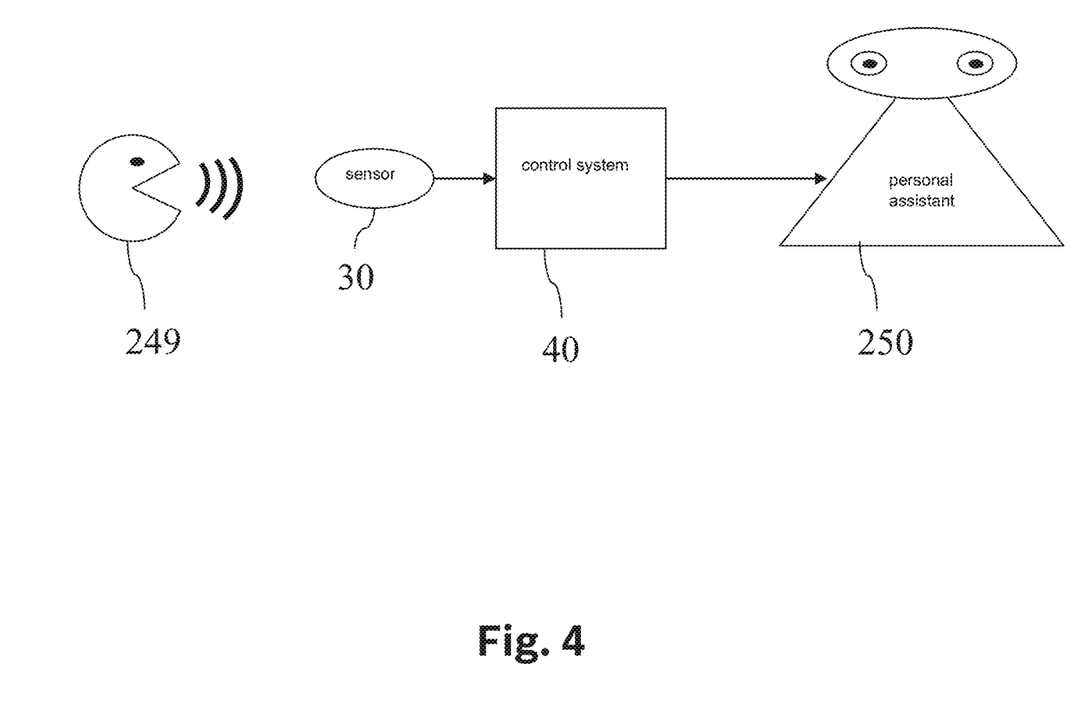
FIG. 4 shows a further exemplifying embodiment of a control system in accordance with the present invention.

FIG. 4 shows an exemplifying embodiment in which control system 40 is used to control a personal assistant 250. Sensor 30 can be one of the sensors recited in conjunction with FIG. 1. Sensor 30 is preferably an acoustic sensor that receives voice signals of a user 249. Alternatively or additionally, sensor 30 can also be configured to receive optical signals, for example video images of a gesture of user 249.

Control system 40 ascertains a control application signal A of personal assistant 250 depending on signals of sensor 30, for example by the fact that the artificial neural network carries out a gesture recognition. This ascertained control application signal A is then conveyed to personal assistant 250 and control is correspondingly applied to it. This ascertained control application signal A can be selected in particular in such a way that it corresponds to a presumed desired control application by user 249. This presumed desired control application can be ascertained depending on the gesture recognized by artificial neural network 60. Control system 40 can then, depending on the presumed desired control application, select control application signal A for transmission to personal assistant 250, or can select control application signal A for transmission to the personal assistant in accordance with the presumed desired control application 250.

This corresponding control application can encompass, for example, the fact that personal assistant 250 retrieves information from a database and reproduces it in a manner receivable by user 249.

Instead of personal assistant 250, a domestic appliance (not depicted), in particular a washing machine, a range, an oven, a microwave oven, or a dishwasher, can be provided to have control correspondingly applied to it.

Figure 5:
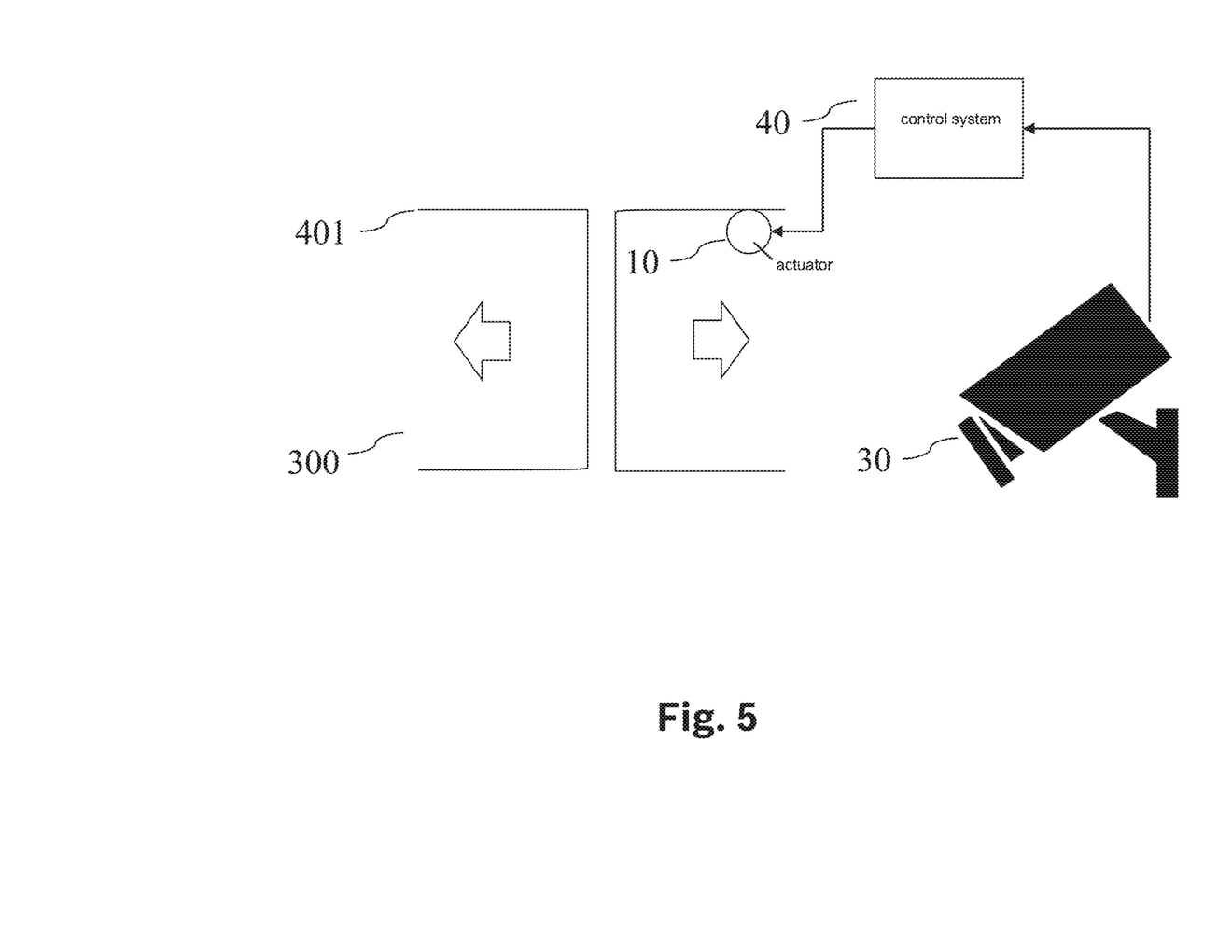
FIG. 5 shows a further exemplifying embodiment of a control system in accordance with the present invention.

FIG. 5 shows an exemplifying embodiment in which control system 40 is used to control an access system 300. Access system 300 can encompass a physical access control, for example a door 401. Sensor 30 can be one of the sensors recited in conjunction with FIG. 1, preferably an optical sensor (for example, for detecting image data or video data), which is configured to detect a face. That detected image can be interpreted by way of artificial neural network 60. For example, the identity of a person can be ascertained. Actuator 10 can be a lock that, depending on control application signal A, does or does not enable access, for example does or does not open door 401. For that purpose, control application signal A can be selected depending on the interpretation of artificial neural network 60, for example depending on the ascertained identity of the person. A logical access control can also be provided instead of physical access control.

Figure 6:
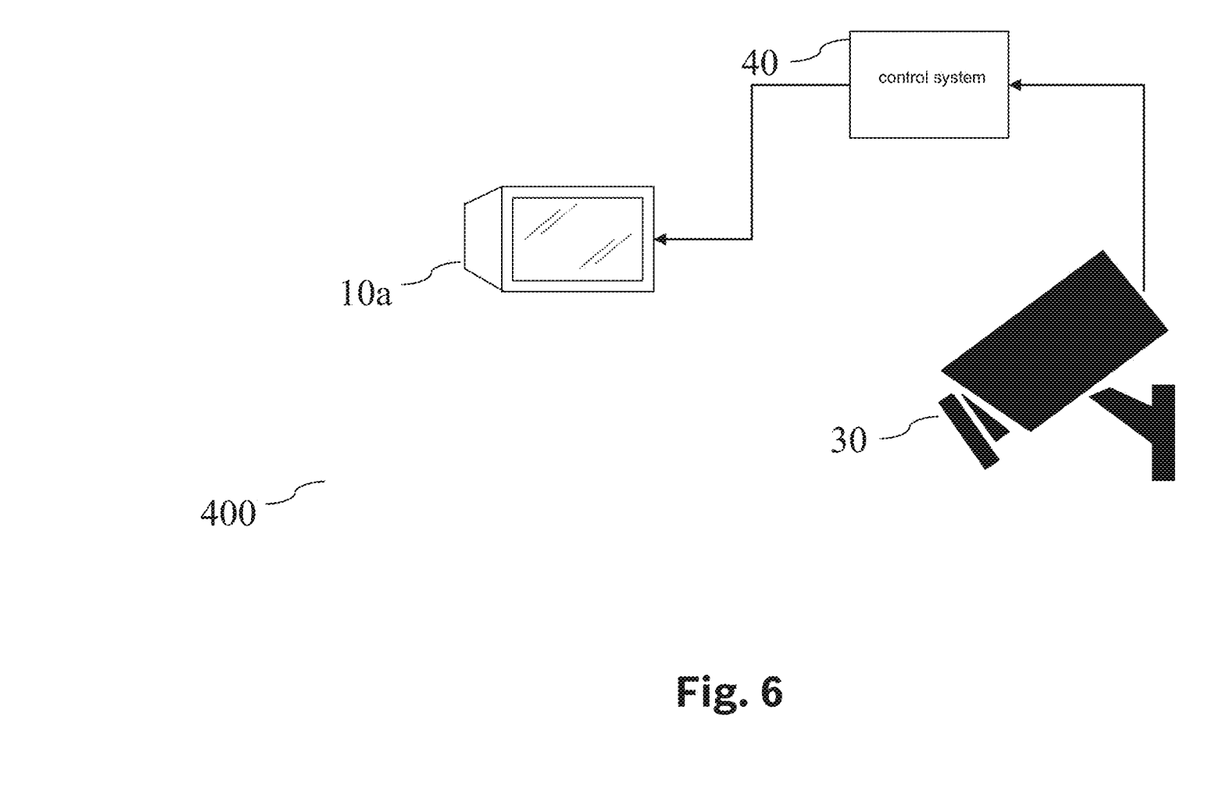
FIG. 6 shows a further exemplifying embodiment of a control system in accordance with the present invention.

FIG. 6 shows an exemplifying embodiment in which control system 40 is used to control a monitoring system 400. This exemplifying embodiment differs from the exemplifying embodiment depicted in FIG. 5 in that what is provided instead of actuator 10 is display unit 10a to which control is applied by control system 40. Artificial neural network 60 can determine, for example, whether an object imaged by the optical sensor is suspicious, and control application signal A is then selected in such a way that that object is displayed by display unit 10a with color emphasis.

Figure 7:
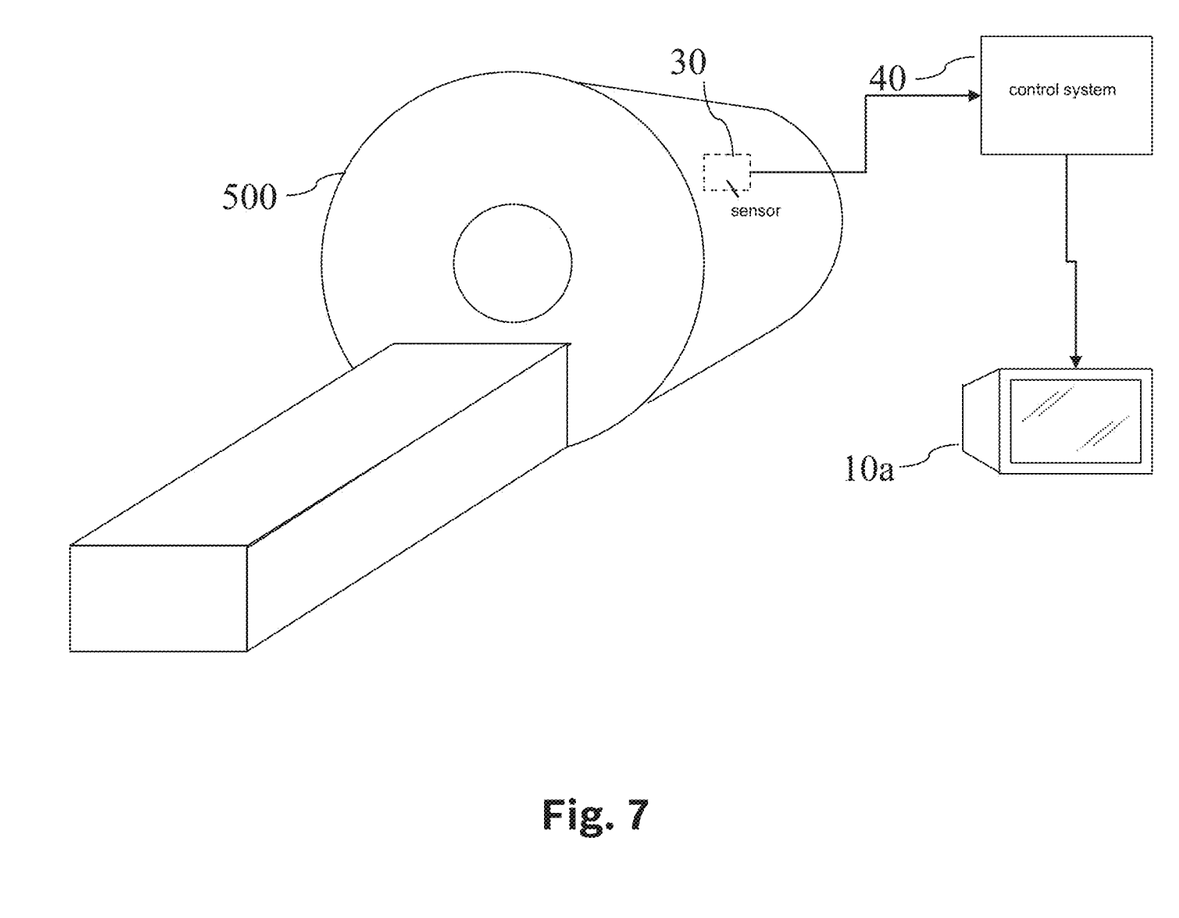
FIG. 7 shows a further exemplifying embodiment of a control system in accordance with the present invention.

FIG. 7 shows an exemplifying embodiment in which control system 40 is used to control a medical imaging system 500, for example an MRI, X-ray, or ultrasonic device. Sensor 30 can be embodied, for example, by an image-producing sensor; control is applied to display unit 10a by way of control system 40. For example, artificial neural network 60 can ascertain whether a region imaged by the image-producing sensor is noteworthy, and control application signal A can then be selected in such a way that that region is displayed by display unit with color emphasis.

Figure 8:
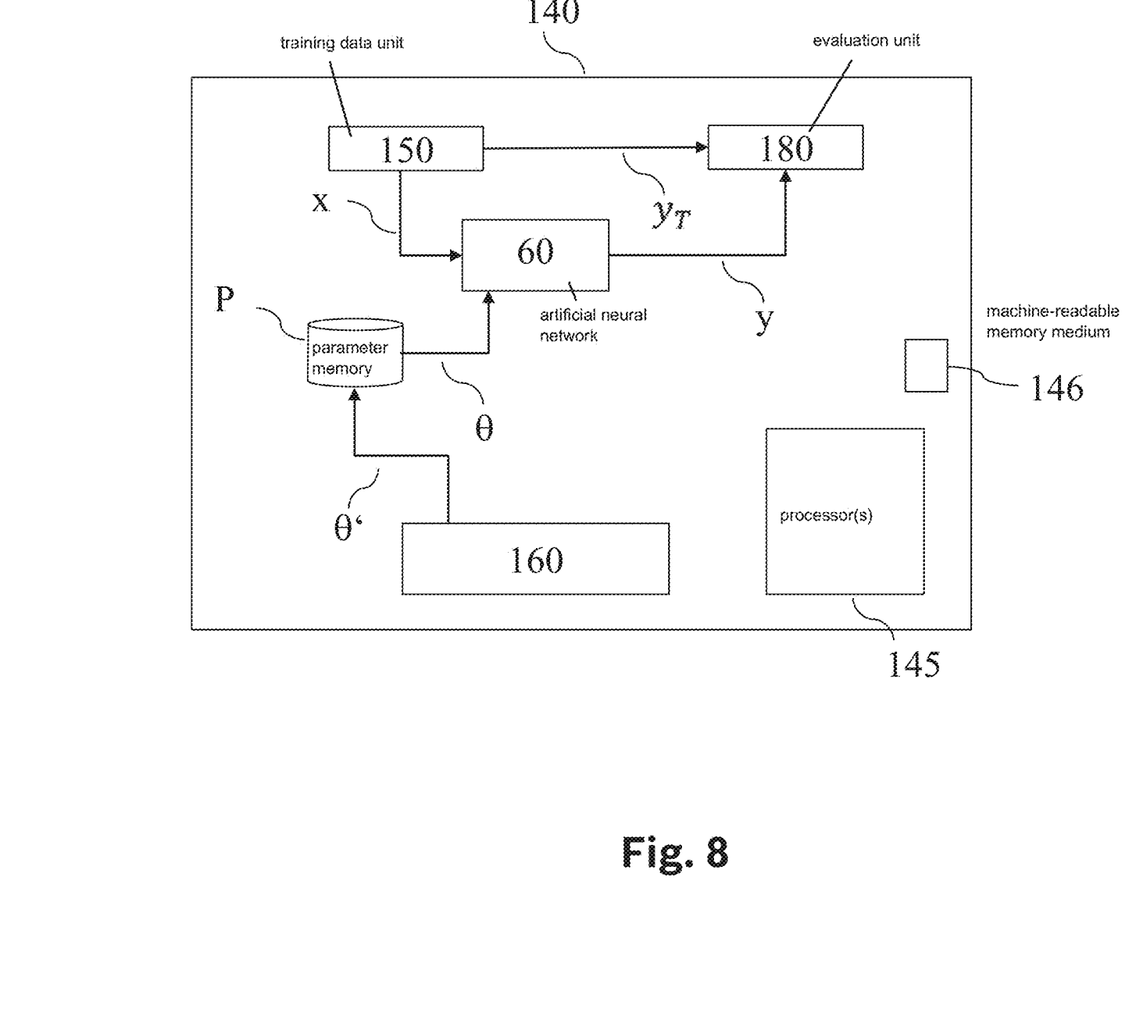
FIG. 8 shows a further exemplifying embodiment of a control system in accordance with the present invention.

FIG. 8 schematically shows an exemplifying embodiment of a training system 140 for training artificial neural network 60 by way of a training method. A training data unit 150 ascertains suitable input signals x that are delivered to artificial neural network 60. For example, training data unit 150 accesses a computer-implemented database in which a set of training data D is stored and, for instance randomly, selects input signals x from the set of training data D. Optionally, training data unit 150 also ascertains desired, or "actual," output signals y which are associated with input signals x and are delivered to an evaluation unit 180.

Artificial neural network 60 is configured to ascertain, from input signals x delivered to it, pertinent output signals $\hat{y}$. Those output signals $\hat{y}$ are delivered to evaluation unit 180.

Evaluation unit 180 can characterize, for example by way of a loss function l that depends on output signals $\hat{y}$ and on the desired output signals y, a performance capability of artificial neural network 60. Parameters θ can be optimized depending on loss function l.

In further preferred embodiments, training system 140 encompasses one or a plurality of processors 145 and at least one machine-readable memory medium 146 on which are stored instructions which, when they are executed on processors 145, cause control system 140 to perform the training method.

Figure 9:
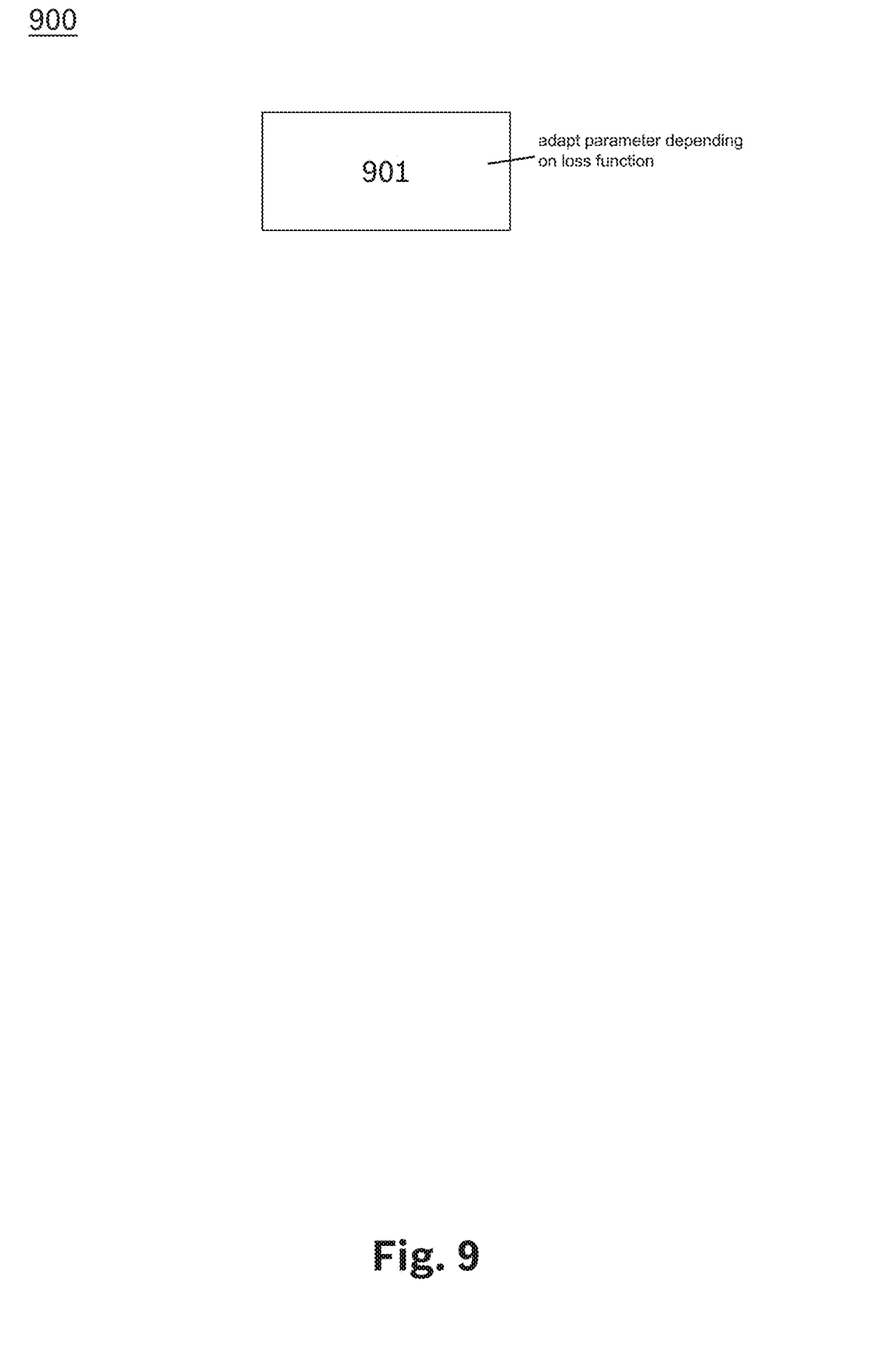
FIG. 9 is a flow chart of an embodiment of the method for training an artificial neural network according to the present invention.

FIG. 9 is a flow chart of an embodiment of method 900 for training an artificial neural network 60 in accordance with the present invention.

In step 901, a parameter θ of artificial neural network 60 that is to be trained is adapted depending on a loss function l, loss function l encompassing a first term that represents an estimate of an expected lower bound (ELBO) of the distances between the classifications 9 of training data sets D by artificial neural network 60 and the expected classifications y of training data sets D.

Loss function l further encompasses a second term that is configured in such a way that differences in the aleatoric uncertainty $\sigma^2$ in training data sets D over different samples of artificial neural network 60 are regulated.

Figure 10:
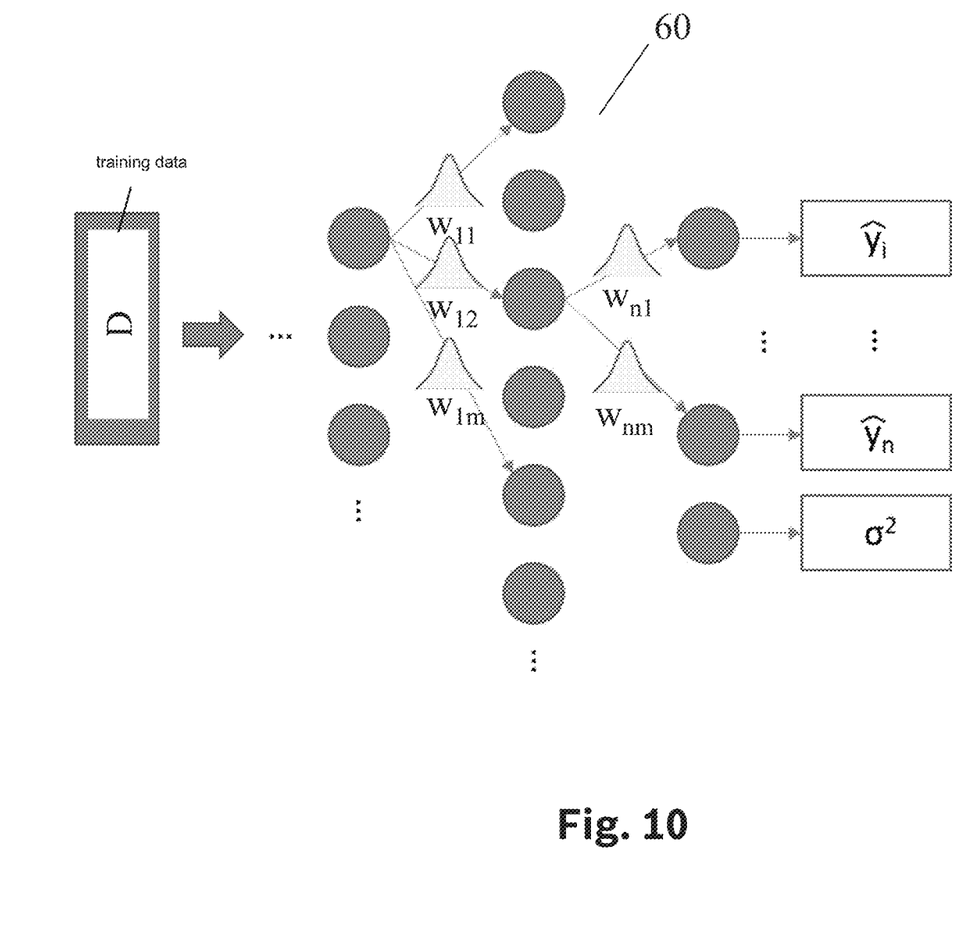
FIG. 10 schematically depicts an artificial neural network according to the present invention.

FIG. 10 schematically depicts an artificial neural network 60 according to the present invention. Artificial neural network 60 that is depicted is a Bayesian neural network 60.

Weights $w_{11}$ to $w_{mm}$ in Bayesian neural network 60 are indicated as probability distributions. For illustrative purposes, weights $w_{11}$ to $w_{mm}$ of the model are reproduced in FIG. 2 as a Gaussian distribution.

The schematic depiction shows a Bayesian neural network 60 that outputs both the aleatoric uncertainty $\sigma^2$ and the epistemic uncertainty as a variance of the network outputs $\hat{y}_i$ to $\hat{y}_n$.

Artificial neural network 60 is trained using training data D.

The value of the epistemic uncertainty is determined separately from the variance of each output dimension $\hat{y}_i$ to $\hat{y}_n$ by sampling weights $w_{11}$ to $w_{mm}$ of the model.

Be it noted that the aleatoric uncertainty $\sigma^2$ should be independent of the respective sample t of weights $w_{11}$ to $w_{mm}$, since it reflects only the uncertainty inherent in training data D.

The aleatoric uncertainty $\sigma^2$ can be separated from the epistemic uncertainty by "penalizing" or taking into consideration the change in the aleatoric uncertainty $\sigma^2$ in outputs of the respective samples t of artificial neural network 60 that is being trained. This consequently results in artificial neural networks 60 having enhanced system reliability, since on the one hand the limits of the model represented by network 60 are known, and on the other hand it is possible to react to the known limits by corresponding training or by corresponding training data.

What is claimed is:

1. A method for training an artificial neural network, for controlling a technical system, by way of training data sets, the method comprising:
adapting a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated.

2. The method as recited in claim 1, wherein the artificial neural network is a Bayesian neural network.

3. The method as recited in claim 2, wherein the second term represents a square of a distance between a variance determination of the training data set and an average variance determination of the training data set over all samples of the Bayesian neural network.

4. The method as recited in claim 3, wherein the second term includes a hyperparameter.

5. The method as recited in claim 1, wherein the first term that represents the estimate of the lower bound includes a regulating part and a negative log likelihood function.

6. The method as recited in claim 1, the lower bound is estimated by way of the loss function, the loss function being defined as follows:

$$l_{ELBO} = \sum_{t=1}^{T} \{\log q(w^{(t)}|\theta) - \log P(w^{(t)}) - \log P(D|w^{(t)})\} + \frac{\alpha}{T}\sum_{t=1}^{T}\left(\sigma^{2(t)} - \left(\frac{1}{T}\sum_{t=1}^{T}\sigma^{2(t)}\right)\right)^2,$$

wherein $\theta$ is a parameter of probability distributions of weights $w^{(t)}$, $w^{(t)}$ is weights of sample t, D is training data, T is a total number of samples, and q is an approximated a posteriori probability of the weights $w^{(t)}$.

7. The method as recited in claim 1, wherein the loss function penalizes change in the aleatoric uncertainty in outputs of the different samples of the artificial neural network.

8. A non-transitory machine-readable memory medium on which is stored a computer program, which when executed controls a method for training an artificial neural network, for controlling a technical system, by way of training data sets, the method comprising:
adapting a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated.

9. An artificial neural network for controlling a technical system, the artificial neural network being trained using training data sets, including adaptation of a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated.

10. The artificial neural network as recited in claim 9, wherein the artificial neural network being trained is a Bayesian neural network.

11. A method, comprising:
providing an artificial neural network for controlling a technical system, the artificial neural network being trained using training data sets, including adaption of a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated; and
controlling the technical system using the trained artificial neural network, the technical system including a robot, or a vehicle, or a tool, or a machine.

12. A non-transitory machine-readable memory medium on which is stored a computer program, the computer program, when executed by a computer, causing the computer to perform the following steps:
providing an artificial neural network for controlling a technical system, the artificial neural network being trained using training data sets, including adaption of a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated; and
controlling the technical system using the trained artificial neural network, the technical system including a robot, or a vehicle, or a tool, or a machine.

13. An apparatus for controlling a technical system, the apparatus comprising:

an artificial neural network for controlling a technical system, the artificial neural network being trained using training data sets, including adaptation of a parameter of the artificial neural network depending on a loss function, the loss function including a first term that represents an estimate of a lower bound of distances between classifications of the training data sets by the artificial neural network and expected classifications of the training data sets, wherein the loss function includes a second term that is configured in such a way that differences in aleatoric uncertainty in the training data sets over different samples of the artificial neural network are regulated.

\* \* \* \* \*